C. W. BARTLEY.
WIRE STRETCHER.
APPLICATION FILED OCT. 31, 1914.
1,190,976.
Patented July 11, 1916.
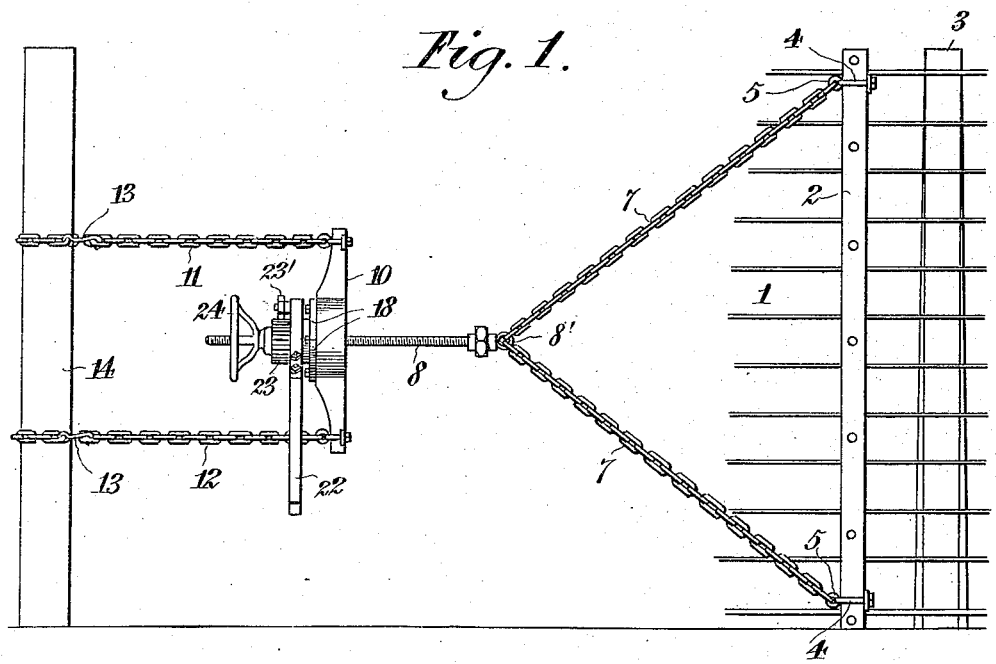
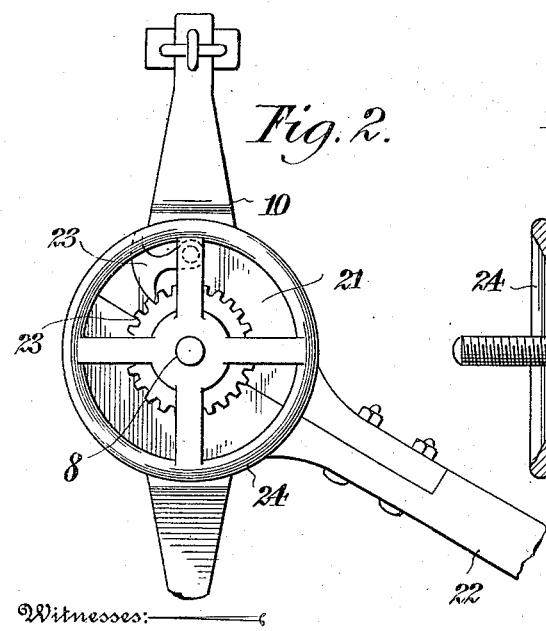
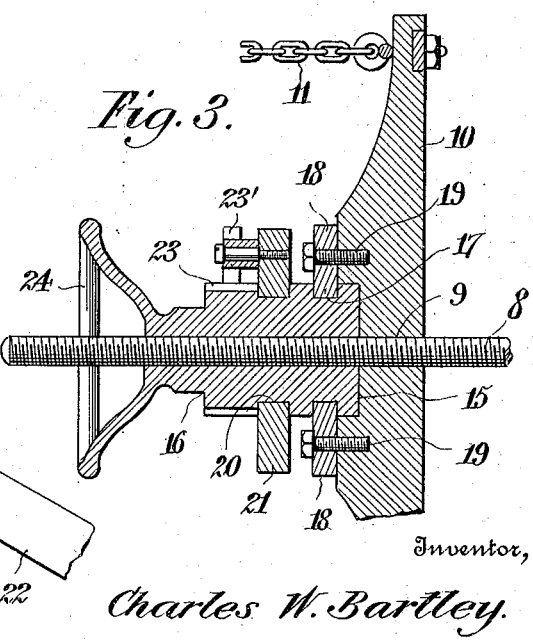
Inventor,
Charles W. Bartley.
By Victor J. Evans,
Attorney.

UNITED STATES PATENT OFFICE.

CHARLES W. BARTLEY, OF ERIE, ILLINOIS.

WIRE-STRETCHER.

1,190,976.

Specification of Letters Patent.

Patented July 11, 1916.

Application filed October 31, 1914. Serial No. 869,648.

*To all whom it may concern:*

Be it known that I, CHARLES W. BARTLEY, a citizen of the United States, residing at Erie, in the county of Whiteside and State of Illinois, have invented new and useful Improvements in Wire-Stretchers, of which the following is a specification.

The present invention relates to improvements in devices for stretching wire fences, and resides in the construction, combination and arrangement of parts set forth in the following specification and falling within the scope of the appended claim.

In the drawing: Figure 1 is a view illustrating my improvement in operative position, Fig. 2 is a longitudinal sectional view on the line 2—2 of Fig. 1, and Fig. 3 is a vertical sectional view on the line 3—3 of Fig. 1.

Referring now to the drawing in detail, the numeral 1 designates an ordinary woven wire fence, 2 vertical clamping bars which are secured to the fence in order to permit of the said fence being stretched and attached to a post 3. The bars 2 have yokes 4 surrounding the same and arranged to the opposite ends thereof, the said yokes being provided with eyes 5 for the reception of the end links of chains 7. These chains have their inner end links secured to an eye 8' which is swiveled upon one end of a longitudinally extending threaded rod 8. The rod 8 passes through an opening 9 provided in what I will term a head 10. This head 10 preferably comprises a rectangular member, and has attached adjacent the opposite ends thereof chain members 11 and 12, each of which having their end links provided with a hook 13, and each of the chains is adapted to be wound around a post 14 to bring their hooks 13 between one of the links of each of the said chains.

The head 10 has, what I will term, its outer face, provided with an annular depression 15 which surrounds its opening 9, and which is adapted to serve as a bearing for a nut member 16. The nut 16 includes a rounded body, having a threaded bore which co-acts with the threads of the rod 8, and the portion of the body next to that received within the annular depression 15 is formed upon its outer perimeter with an annular depression or slot 17, blocks 18 having their inner edges provided with semi-circular depressions being received within the groove 17, and connected with the head 10 through the medium of bolts 19.

The nut or member 16 has its outer face provided with a second annular depression 20 which is adapted to receive the semi-cylindrical portions provided upon the members comprising a head 21 for a lever 22. The portion of the nut 16 beyond its groove 20 is formed with teeth 23, and the head 21 has pivotally connected therewith a double-headed pawl 23'. This pawl may, of course, be swung to bring either of its engaging portions between the teeth 23, so the lever 22 may be manipulated to turn the nut 16 in two directions, to draw the threaded rod 8 toward the head or permit of the said rod being moved toward the fence and clamp.

Preferably integrally formed with the nut 16 is a handwheel 24, which may be employed when it is not convenient to operate the lever 22 or when only a slight adjustment of the threaded bar 8 is required.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

A wire stretcher including a threaded rod, a head having an opening through which the rod passes, said head having its inner face provided with an annular depression which surrounds the opening, a grooved nut having a rounded perimeter received within the recess, removable means mounted within the groove of the nut and contacting with one face of the rounded perimeter and connected with the head and coöperating with the rod for sustaining the nut upon the head rotatable with respect to the latter, said nut receiving the rod and coöperating with the threads thereof, a lever including a head arranged for rotation upon the nut, the nut being provided with teeth, a dog having two engaging faces pivoted to the head and adapted to engage between the teeth of the nut for imparting rotary movement to said nut, and a hand wheel formed contiguous with the free end of the nut for imparting a further rotary movement to the nut independent of the first mentioned means.

In testimony whereof I affix my signature in presence of two witnesses.

CHARLES W. BARTLEY.

Witnesses:
L. A. MATTHEWS,
F. H. SIMPSON.

Copies of this patent may be obtained for five cents each, by addressing the "Commissioner of Patents, Washington, D. C."